United States Patent [19]

Cooper

[11] 3,737,679

[45] June 5, 1973

[54] RADAR MODULATOR

[75] Inventor: George P. Cooper, Corona Del Mar, Calif.

[73] Assignee: North American Rockwell Corporation, El Segundo, Calif.

[22] Filed: Feb. 4, 1972

[21] Appl. No.: 223,651

[52] U.S. Cl. ....................307/252 J, 307/268, 328/65, 328/67

[51] Int. Cl. ............................H03k 17/72, H03k 1/00

[58] Field of Search ...........................307/252 J, 268; 328/67, 65, 66

[56] References Cited

UNITED STATES PATENTS 3,508,135 4/1970 Dijkstra et al. ...................307/252 Q 3,532,901 10/1970 Hylten-Cavallius et al. .......307/252 L 3,662,189 5/1972 Robinson et al. ....................328/67 X

*Primary Examiner*—John Zazworsky

*Attorney*—L. Lee Humphries, H. Fredrick Hamann and Rolf M. Pitts

[57] ABSTRACT

In a silicon-controlled-rectifier type switched or triggered pulse modulator, means for effecting an energy level reduction for a given "current-time" product associated with soaking the silicon-controlled rectifier which switches the main pulse-forming network. An auxiliary pulse-forming network is diode-coupled to an auxiliary charging choke and diode coupled to the input of a main delay reactor, the network response time being matched to the delay time of the delay reactor of the pulse modulator.

10 Claims, 3 Drawing Figures

RADAR MODULATOR

BACKGROUND OF THE INVENTION

The field to which the subject invention relates is the use of silicon-controlled-rectifier switches in short-pulse radar modulators.

In the design and principles of operation of short pulse modulators for providing pulses of a given energy level, a pulse-forming network is used. This network, when charged, is capable of discharging the charge energy within a preselected pulsewidth interval via a pulse transformer. Charging of the network is done over a charging period in excess of the pulsewidth sought and with a charging current lower than the pulse discharge current. In other words, the slow-charge energy is rapidly discharged to obtain the high-energy pulse of interest by means of a switching device. A description of prior art pulse modulators employing hydrogen thyratron type switching devices is described at pages 248–255 of "Introduction to Radar Systems" by Skolnik (McGraw-Hill, 1962).

Silicon-controlled rectifier (SCR) switches are commonly used for the pulse switch of pulse forming line type pulse modulators. In such application, they replace the hydrogen thyratron previously used. A basic problem with silicon-controlled rectifier (SCR) switches is their limited capability for handling large rates of change of current (*di/dt*) immediately after turn-on.

A common design practice is to make use of a delay reactor (a square hysterisis loop core reactor) in series with (or as the first inductance of) the pulse forming network (PFN). This involves a high series inductance, thus restricting starting current flow when the SCR is first switched on, and delays the main current pulse until the delay reactor core saturates. If an efficient delay reactor core were used, the current during the delay time will be low, and such low current will not enable the SCR impedance to reach a sufficiently low value before the core saturates. (In other words, the SCR impedance varies somewhat inversely with current flow therethrough and turn-on time.) Thus a larger proportion of the pulse energy is dissipated by such larger SCR impedance. Consequently, in design practice either a less efficient delay reactor has been used or a resistor used to allow current flow through the SCR during the delay time. If the PFN is designed for a very short pulse, its energy storage capability is low. The current the PFN must furnish for soaking the SCR during the delay time partially discharges the PFN, resulting in a reduced output pulse amplitude.

The most desirable soaking current for the SCR consists of a current pulse that builds up slowly (relative to the discharge pulse length) to an appreciable part of the peak pulse current. As an example, for a 0.1 $\mu$sec pulse length PFN, the desired peak soaking current could be as much as 10 percent of the peak discharge current and the delay time may be as high as 10 times the pulse length (1 $\mu$sec). However, this combination of current and time would essentially discharge the total energy of the PFN.

Adding additional capacity to the PFN does not solve the problem of providing maximum soaking energy for a desired pulsewidth since the additional capacity would tend to undesirably increase the pulse length, or increase the required voltage. It is also possible to redesign the PFN for twice the energy capability by reducing the line impedance and allowing for the energy drop due to the soaking current load. However, it is apparent that this latter approach doubles the required energy per pulse for the modulator and results in doubling the required power for operating the transmitter.

In brief, prior art design approaches to providing maximum soaking energy without increasing the desired pulsewidth, tend to be anomalous, serving to either limit the soaking effect obtained or else undesirably increasing the discharge pulsewidth.

SUMMARY OF THE INVENTION

By means of the concept of the invention employing a supplemental pulse forming network in the charging circuit of a pulse modulator, the above-noted shortcomings of the prior art are avoided.

In a preferred embodiment of the invention there is provided a pulse modulator employing a silicon-controlled-rectifier type switch shunted across the triggered input to a delay reactor, the reactor being connected in series with the input of a pulse-forming network. A charging choke is unipolarly coupled to the input of the delay reactor.

There is also provided an auxiliary pulse-forming network unipolarly input coupled to an auxiliary charging choke and unipolarly output coupled to the input of the delay reactor, the unipolar inputs to the delay reactor being like-poled. The pulsewidth response of the auxiliary pulse forming network is preselected to be approximately the same as the delay time of the delay reactor.

In normal cooperation of the above-described arrangement, the shape of the controlled waveform output of the auxiliary pulse forming network provides a delayed peak soaking current which is a substantial percentage of the peak current of the main pulse forming network (which occurs on saturation of the delay reactor core). In this way, the low-voltage supplemental soaking current waveform allows a reduction in the energy required to effect a given current-time product for SCR soaking. In other words, a significant increase in soaking time and soaking current are obtained, resulting in improved pulse shape and reduced SCR power dissipation, and allowing the use of cheaper, lower performance (slower turn-on, lower-power) silicon-controlled rectifiers for a given pulse modulator design. Essentially very little discharge of the main pulse-forming network occurs during the soak interval, whereby the soak current design requirements may be developed independently of the main pulse-forming network pulse design requirements, and the soaking current substantially eliminated from the pulse transformer loop.

Accordingly, an object of the subject invention is to provide an improved pulse modulator.

Another object of the invention is to provide a silicon-controlled rectifier type pulse modulator employing reduced charging energy to achieve a given current-time product.

A further object of the invention is to provide an ancillary circuit in cooperation with a SCR triggered pulse modulator for compensatorily supplementing the soaking current waveform.

These and other objects of the invention will become apparent from the following description, taken together with the accompanying drawings in which:

DESCRIPTION OF THE PREFERRED EMBODIMENT

Figure 1:
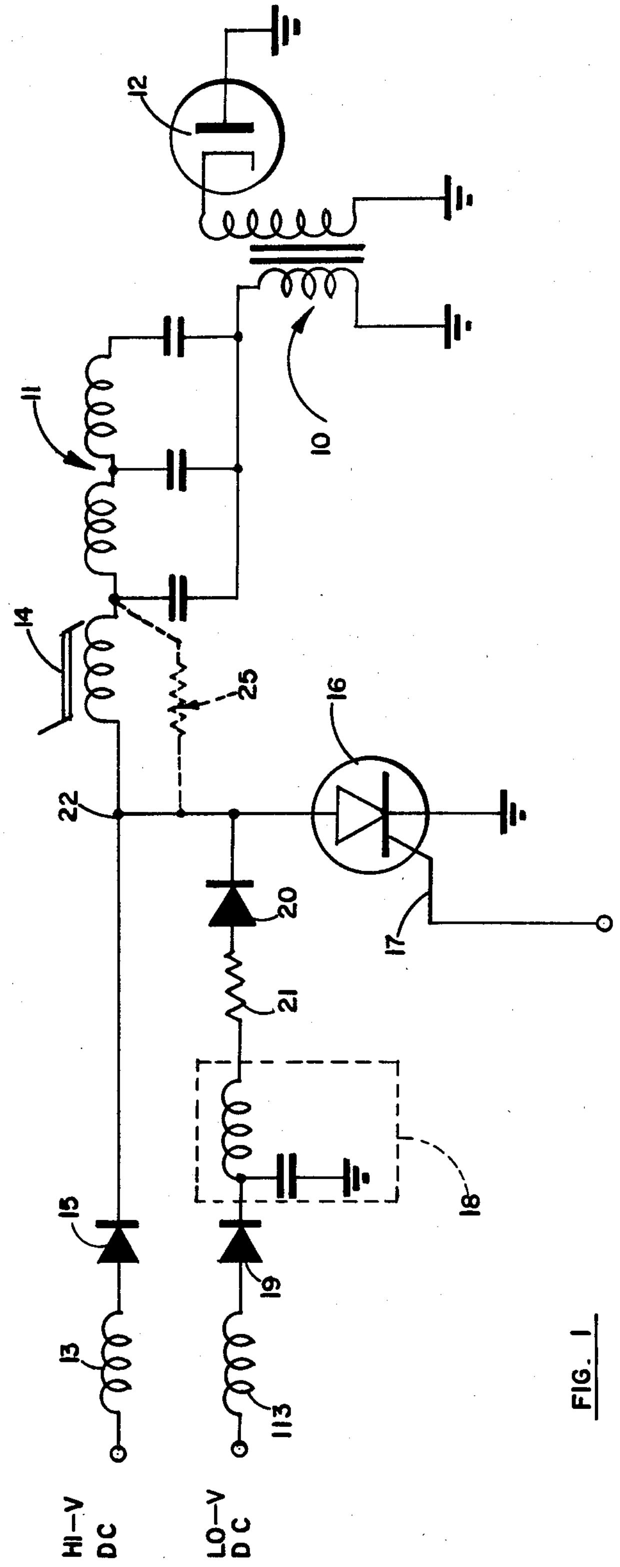
FIG. 1 is a schematic diagram of a pulse modulator circuit embodying the concept of the invention.

Referring now to FIG. 1, there is illustrated a schematic diagram of a pulse modulator circuit embodying the concept of the invention. There is provided a pulse transformer 10 for coupling electromagnetic pulse energy released from a first pulse forming network 11 to pulse utilization means 12. Pulse forming network 11 is coupled to a charging transformer or choke 13 by means of a saturable delay reactor 14, an isolating or charging diode 15 being interposed in series circuit between choke 13 and reactor 14. A silicon controlled rectifier switch 16 is shunted across the input to delay reactor 14, the control electrode 17 of SCR 16 being adapted to be responsively coupled in circuit to a source of an input trigger signal. All of elements 10–16 are well-known in the art and are easily designed or are commercially available.

In ordinary operation of the above-described arrangement, pulse forming network 11 cooperates as a lumped capacitance in cooperation with saturable reactor 14 and is charged by charging-choke 13 via charging-diode 15 during the "off" or normally non-conducting interval of SCR 16. The reverse or non-conducting impedance of charging diode 15 prevents discharge of the main pulse forming network 11 through the energy source 13.

Upon the "turning-on" or triggering of SCR 16 to a low impedance or conductive state, pulse-forming network 11 discharges through the circuit provided by pulse transformer 10, SCR 16 and saturable reactor 14, the current pulse reaching a maximum when reactor 14 reaches saturation. The SCR soaking current during the pulsing or discharge interval of main PFN 11 of course dissipates part of the charged energy of PFN 11 (as a function of the SCR soaking impedance) unless compensated for. Prior art compensation has employed a soaking resistor 25 shunted across reactor 14; however, such design approach is of limited effectiveness because of the attendant energy losses therethrough.

Figure 2:
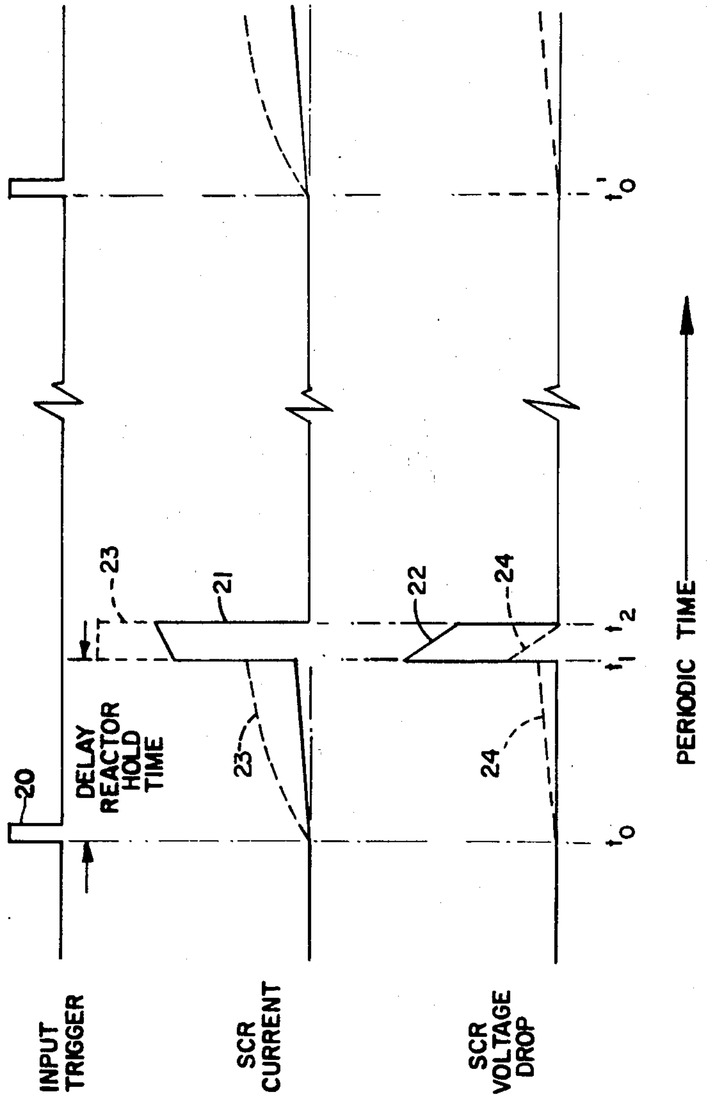
FIG. 2 is a family of time histories illustrating the component responses of certain elements of the arrangement of FIG. 1.

Such operation of the above-described arrangement may be appreciated from FIG. 2 in which is illustrated a family of time histories of several components of the circuit of FIG. 1. Curve 20 represents an input trigger applied periodically to control electrode 17 of SCR 16 (in FIG. 1), curve 21 represents the SCR soaking current supplied SCR 16 by reactor 14, and curve 22 represents the voltage drop across SCR 16. Curves 23 and 24 represent respective compensated SCR current and voltage wave forms obtained by means of the invention (described more fully hereinafter): the increased soaking current and soaking interval (curve 23 between $t_o$–$t_2$) resulting in a reduced SCR impedance and associated reduced SCR peak voltage waveform (curve 24 between $t_1$ and $t_2$).

Compensation of the SCR soaking current requirement during the pulse period is provided by means of an auxiliary PFN 18 (in FIG. 1) unipolarly coupled to a low-voltage auxiliary charging choke 113 by diode 19, and unipolarly coupled to input terminal 22 (which commonly interconnects reactor 14, diode 15 and SCR 16) by means of series connected isolating-diode 20 and load resistor 21. (However, resistor 21 is not necessary and may be omitted if desired.) The pulsewidth of auxiliary PFN 18 is approximately matched to the delay time of saturable reactor 14, the shape of the current pulse from PFN 18 having a slow initial rate of build-up, the current peak thereof occurring about the same time as saturation of reactor 14 and the magnitude of such peak being at least equal to the SCR soaking current required during such peak current discharge of main PFN 11, whereby the increased current curve 23 of FIG. 2B is obtained.

When SCR 16 is turned-off and while PFN 11 is being charged through reactor 14 and charging diode 15 (i.e., interval $t_2$–$t_o'$ in FIG. 2), the higher voltage at terminal 22 back-biases diode 20 as to assure isolation of PFN 18 from PFN 11 during such interval. Upon the turning-on of SCR 16 (in response to a trigger signal periodically applied to terminal 17), the voltage level at terminal 22 is reduced to substantially zero volts and PFN 11 discharges therethrough, the discharge pulse being output-coupled by means of pulse transformer 10, the output pulse reaching a peak at that point in time ($t_1$ in FIG. 2) when delay reactor 14 reaches saturation. Such almost zero voltage condition of SCR 16 removes the back-bias condition from isolating diode 20, thereby allowing auxiliary PFN 18 to discharge through SCR 16, the peak of such discharge occurring at about the same time as the delay reactor 14 saturates, allowing the discharge of PFN 11 through delay reactor 14. The peak current from auxiliary PFN 18 is at a level corresponding to the soaking requirements of SCR 16. In this way, the soaking current and soaking interval (curve 23 during $t_o$–$t_2$) substantially reduce the normal SCR conductive impedance, whereby dissipation of the high main pulse energy level is minimized or compensated for, while the lesser compensatory energy required for such auxiliary soaking is obtained from a substantially lower voltage source.

The energy stored in a PFN is: $E = ½ CV^2$ so that the net effect of operating the auxiliary line with reduced voltage is a reduction in energy used to accomplish a given current-time product for SCR soaking. Auxiliary PFN 18 is isolated from the pulse PFN by diode 20 when the SCR is open. Upon switching SCR 16 to the ON state, the voltage at terminal 22 drops to near 0 volt, allowing the auxiliary line to discharge through the SCR.

A numerical example of the energy advantage is described below.

Assume:

Pulse PFN charged to 500V

Pulse PFN $Z_n$ = 2.5 ohms

Pulse PFN Pulsewidth = 0.1 μsec

For a PFN the total capacitance is approximately $$C_T = tp/2Z_n \text{ when } t_p \text{ is the pulsewidth at the 70 percent points.}$$

so $$C_T = .1/(2)\ (2.5) = .1/5 = .02\ \mu\text{fd}$$

then $$E_P = \frac{1}{2} CV^2 = \frac{1}{2} (.02) \times 10^{-6} \times 500^2$$

$$E_P = 2.5 \text{ millijoules}$$

The peak pulse current is $I_P = 250V/2.5 = 100$ amps for 0.1 $\mu$sec

If the desired soak current is drained from main PFN 11 and is 10 amps for 1.0 $\mu$sec, PFN 14 would be essentially discharged, wasting 2.5 millijoules.

If the auxiliary PFN 18 is operated at 50 volts and is designed to furnish 10 amps for 1 $\mu$sec $Z_{aux\ n} = 25/10 = 2.5$ ohms $C_{T\ aux\ n} = t_p/2Z_n = 1/5 = .2\ \mu$fd $E_{aux\ p} = \frac{1}{2} CV^2 = \frac{1}{2} (.2) (50)^2 \times 10^{-6}$ $E_{aux\ p} = .25$ millijoules so the total energy used for soaking is reduced by a factor of 10/1.

This reduction in energy required allows a significant increase in the soaking time and current so that the SCR voltage drop during the main pulse is substantially reduced, resulting in improved pulse shape, reduced SCR power dissipation, and allows the use of slower turn-on lower power (cheaper) SCR's for a given modulator design.

Secondary advantages are the elimination of soaking current from the pulse transformer loop, and also making the soak current requirements independent of the main pulse-forming network pulse requirement, i.e., essentially very little discharge of the PFN during the soak interval.

Accordingly, there has been described an improved pulse modulator useful in pulsed radar system applications.

Figure 3:
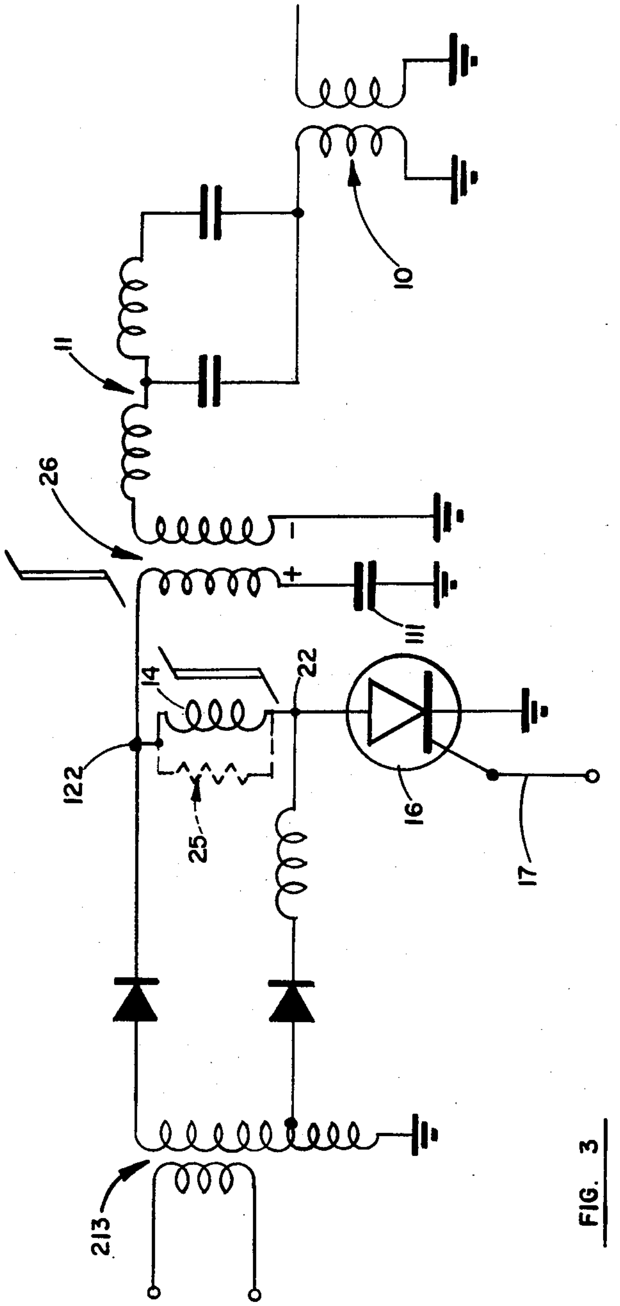
FIG. 3 is a schematic diagram of a special higher power application of the modulator scheme of FIG. 1.

Although the charging source in FIG. 1 has been described in terms of DC-excited chokes 13 and 113, alternatively a charging transformer may be substituted for choke 13 and include a low-voltage auxiliary charging tap in lieu of auxiliary charging choke 113, as shown by element 213 in FIG. 3.

Referring to FIG. 3, there is shown a high-power application in which a switching transformer 26 is inserted in circuit between reactor 14 and PFN 11, trigger SCR 16 and reactor 14 being employed to charge PFN 11 via transformer 26, saturation of transformer 26 allowing discharge of PFN 11. By timing the SCR trigger (applied to terminal 17) to occur prior to cessation of the excitation pulse applied to the primary of charging transformer 213, both the discrete capacitor of auxiliary pulse forming network 18 and isolating diode 20 of FIG. 1 may be omitted, as shown in the arrangement of FIG. 3. If, however, greater design latitude or timing flexibility is desired, then such elements may be retained in the embodiment of FIG. 3 in the like manner as FIG. 1.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulse modulator employing a silicon controlled rectifier type switch shunted across a triggered input to a delay reactor in series with a pulse forming network circuit, a charging transformer coupled to said input of said delay reactor, and having auxiliary charging choke means associated therewith, and an auxiliary pulse forming network input coupled to said auxiliary charging choke means and output coupled to the input of said delay reactor.

2. The device of claim 1 in which a load resistor is interposed in series circuit between an output terminal of said auxiliary pulse forming network and an output coupling thereof.

3. The device of claim 1 in which then is further provided three coupling diodes, a respective one of said coupling diodes being interposed in series circuit between said charging transformer and said input to said delay reactor, between said auxiliary charging choke means and an input of said auxiliary pulse forming network and between an output of said auxiliary pulse forming network and said delay reactor.

4. The device of claim 3 in which a load resistor is interposed in series circuit between an output terminal of said auxiliary pulse forming network and an associated coupling diode.

5. The device of claim 1 in which the peak response time of said auxiliary pulse forming network is substantially equal to the delay provided by said delay reactor.

6. In a pulse modulator employing a silicon controlled rectifier type switch means shunted across a triggered input to a delay reactor having an output winding and connected in series with a pulse forming network circuit, the combination comprising a charging choke diode-coupled to said delay reactor, and having auxiliary charging choke means associated therewith, and an auxiliary pulse forming network diode-input-coupled to said auxiliary charging choke means and diode output coupled to said delay reactor.

7. The device of claim 6 in which said diode couplings are mutually commonly poled.

8. The device of claim 6 in which there is further provided a load resistor interposed in series circuit between an output terminal of said auxiliary pulse forming network and a diode output coupling thereof.

9. The device of claim 6 in which said delay reactor and said auxiliary pulse forming network are further arranged such that the delay provided by the delay reactor is substantially equal to the peak pulse time of the auxiliary pulse forming network.

10. The device of claim 6 in which there is further provided a switching transformer interposed in circuit between said delay reactor and said first mentioned pulse forming network, and a capacitor in series with a primary winding of said switching transformer.

* * * * *